(12) United States Patent
Byun

(10) Patent No.: US 10,013,209 B2
(45) Date of Patent: Jul. 3, 2018

(54) MEMORY SYSTEM AND OPERATING METHOD OF MEMORY SYSTEM

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 126 days.

(21) Appl. No.: 15/152,165

(22) Filed: May 11, 2016

(65) Prior Publication Data

US 2017/0147260 A1     May 25, 2017

(30) Foreign Application Priority Data

Nov. 25, 2015   (KR) .................. 10-2015-0165430

(51) Int. Cl.
G06F 12/12       (2016.01)
G06F 3/06        (2006.01)
G06F 12/0888     (2016.01)
G06F 12/1009     (2016.01)
G06F 12/126      (2016.01)

(52) U.S. Cl.
CPC .......... G06F 3/0659 (2013.01); G06F 3/0611 (2013.01); G06F 3/0685 (2013.01); G06F 12/0888 (2013.01); G06F 12/1009 (2013.01); G06F 12/126 (2013.01); G06F 12/12 (2013.01); *G06F 2212/1021* (2013.01); *G06F 2212/60* (2013.01)

(58) Field of Classification Search
CPC .... G06F 3/0659; G06F 3/0611; G06F 3/0685; G06F 12/0888; G06F 12/1009; G06F 12/126; G06F 12/12

USPC ................................................. 711/154, 112
See application file for complete search history.

(56) References Cited

U.S. PATENT DOCUMENTS

| | | | | |
|---|---|---|---|---|
| 6,415,373 | B1* | 7/2002 | Peters ................. | G06F 11/1076 711/114 |
| 6,711,635 | B1* | 3/2004 | Wang .................... | G06F 3/0613 710/52 |
| 7,321,692 | B2* | 1/2008 | Bryborn ................. | B29C 45/14 382/202 |
| 8,601,219 | B2* | 12/2013 | Yano .................... | G06F 12/0246 365/189.011 |
| 8,688,948 | B2* | 4/2014 | Lordello ............. | G06F 12/0292 711/202 |
| 2006/0008242 | A1* | 1/2006 | Dolph ...................... | H04N 5/76 386/248 |
| 2015/0074335 | A1* | 3/2015 | Matsudaira ......... | G06F 12/0246 711/103 |
| 2016/0188208 | A1* | 6/2016 | Kim ........................ | G06F 3/061 711/103 |
| 2016/0299689 | A1* | 10/2016 | Kim ........................ | G06F 3/061 |

FOREIGN PATENT DOCUMENTS

| KR | 1020110116865 | 10/2011 |
|---|---|---|
| KR | 1020140006299 | 1/2014 |

* cited by examiner

*Primary Examiner* — Pierre Miche Bataille
(74) *Attorney, Agent, or Firm* — IP & T Group LLP

(57) ABSTRACT

A memory system may include: a memory device including a plurality of memory blocks; and a controller including a memory, and suitable for storing segments of data corresponding to a command received from a host in the memory, and storing a first segment for a first time point and a second segment for a second time point selected from among the segments in the memory blocks on a program basis at the first time point.

18 Claims, 13 Drawing Sheets

MEMORY SYSTEM AND OPERATING METHOD OF MEMORY SYSTEM

CROSS-REFERENCE TO RELATED APPLICATIONS

The present application claims priority of Korean Patent Application No. 10-2015-0165430, filed on Nov. 25, 2015, which is incorporated herein by reference in its entirety.

BACKGROUND

1. Field

Exemplary embodiments of the present invention relate to a memory system, and more particularly, to a memory system for processing data to a memory device and an operating method thereof.

2. Description of the Related Art

The computer environment paradigm has shifted to ubiquitous computing systems that can be used anywhere and at any time. Due to this, use of portable electronic devices, such as mobile phones, digital cameras, and notebook computers has rapidly increased. These portable electronic devices generally use a memory system having one or more semiconductor memory devices as a data storage for storing data. The semiconductor memory devices are referred to hereinafter for convenience simply as memory devices. Memory systems may be used as main or auxiliary memory devices of portable electronic devices.

Memory systems using semiconductor memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system which is capable of more rapidly and stably processing data to a memory device than existing systems and an operating method thereof.

In an embodiment, a memory system may include: a memory device including a plurality of memory blocks; and a controller including a memory, the controller being suitable for storing segments of data corresponding to a command received from a host in the memory, and storing a first segment for a first time point and a second segment for a second time point selected from among the segments in the memory blocks on a program basis at the first time point.

When the size of the first segment is smaller than the size of a program unit basis, the controller may write the first segment and the second segment to the first memory block at the first time point.

The size of the second segment may correspond to a size obtained by excluding the size of the first segment from the size of the program unit basis.

The controller may store the first segment for the first time point and the second segment for the second time point in a first memory block of the memory blocks on the program unit basis at the first time point, and the controller may check first map segments for the data in a second memory block of the memory blocks, and checks second map segments for the first map segments among the segments.

The controller may select the second map segments as the first and second segments, and stores the first and second segments in the first memory block of the memory blocks on the program unit basis at the first time point.

The controller may determine empty areas at the positions of the second map segments in the segments, and loads the first map segments to the empty areas from the second memory block.

The controller may loads a third map segment among the first map segments to the empty areas at the first time point, and loads a fourth map segment among the first map segments to the empty areas at the second time point.

Each of the first and second segments may have a size obtained by dividing a unit for the program basis.

The first segment may have a higher priority than the second segment according to cache replacement policy considering the priority of the segments, and is selected prior to the second segment.

The segments may include segments of user data corresponding to the command and segments of map data for the user data.

In an embodiment an operating method of a memory system including a memory device and a controller having a memory, may include: receiving a command from a host; storing segments of data corresponding to the command in a memory of the controller; and storing a first segment for a first time point and a second segment for a second time point selected from among the segments in the memory blocks on a program basis at the first time point.

The storing of the first and second segments in the first memory block may include writing the first segment and the second segment to the first memory block at the first time point, when the size of the first segment is smaller than the size of a unit for the program basis.

The size of the second segment may correspond to a size obtained by excluding the size of the first segment from the size of the unit for the program basis.

Storing of the first segment for the first time point and the second segment for the second time point may include storing the first segment for the first time point and the second segment for the second time point in a first memory block of the memory blocks on the program unit at the first time point, and may further include: checking first map segments for the data in a second memory block of the memory blocks; and checking second map segments for the first map segments among the segments.

The operating method may further include selecting the second map segments as the first and second segments, and storing the first and second segments in the first memory block of the memory blocks on the program basis at the first time point.

The operating method may further include: determining empty areas at the positions of the second map segments among the segments; and loading the first map segments to the empty areas from the second memory block.

The loading of the first map segments may include: loading a third map segment among the first map segments to the empty areas at the first time point; and loading a fourth map segment among the first map segments to the empty areas at the second time point.

Each of the first and second segments may have a size which is obtained by dividing a unit for the program basis.

The first segment may have a higher priority than the second segment according to cache replacement policy considering the priority of the segments, and is selected prior to the second segment.

The segments may include segments of user data corresponding to the command and segments of map data for the user data.

DETAILED DESCRIPTION

Figure 1:
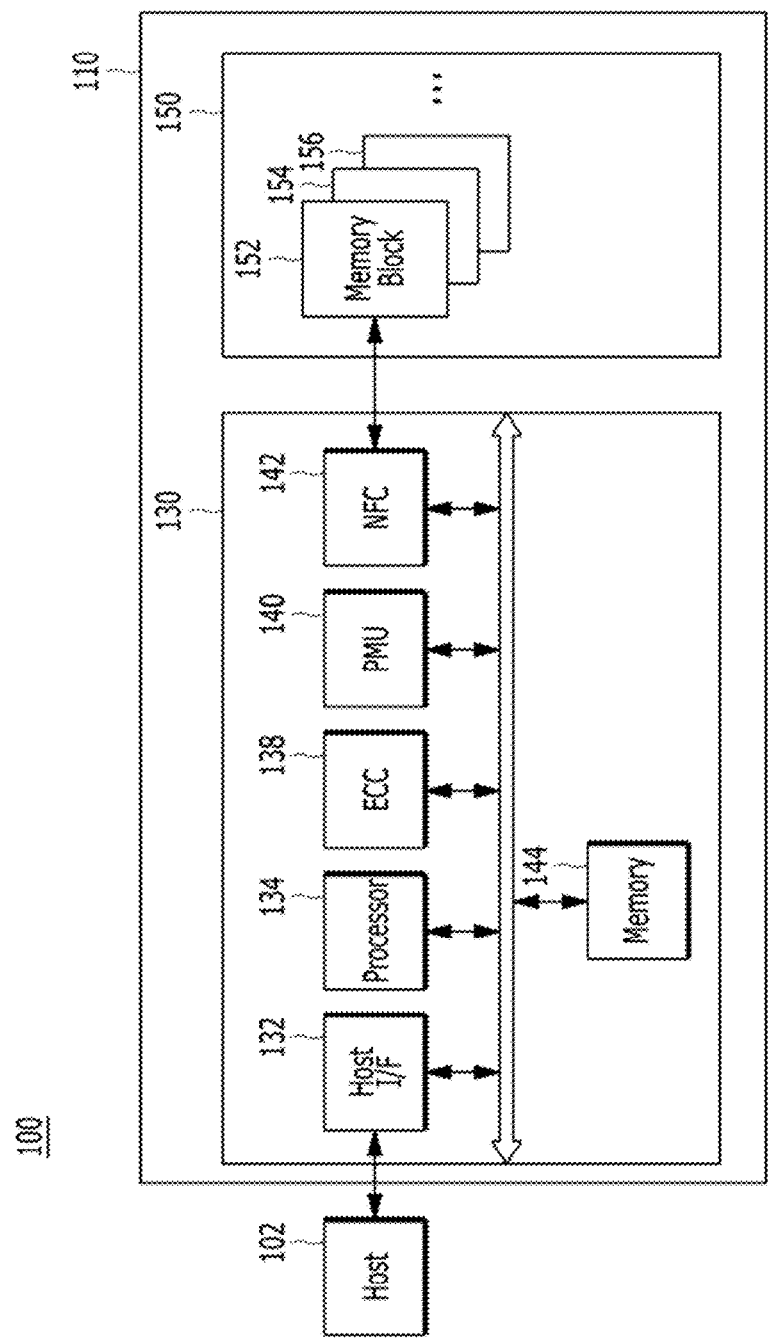
FIG. 1 is a diagram illustrating a data processing system including a memory system, according to an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise (or include) or have other elements as well as those elements if there is no specific limitation. The terms of singular form may include plural forms unless stated otherwise.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone an MP3 player, a laptop computer and the like. The host may include a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC) a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM) an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 50 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or include a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed. The PMU may include any suitable circuits, systems and devices.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or include a volatile memory. For example, the memory 144 may be or include a static random access memory (SRAM) or a dynamic random access memory (DRAM). As described above, the memory 144 may store data used by the host 102 and the memory device 150 for read and/or write operations. The memory 144 may be or include a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL) for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed to memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
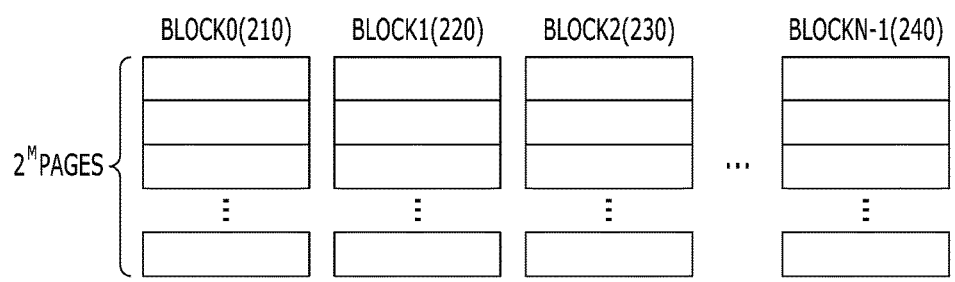
FIG. 2 is a diagram illustrating a memory device, according to an embodiment of the present invention.

Referring to FIG. 2 the memory device 150 may include a plurality of memory blocks, for example, zeroth to $(N-1)^{th}$ blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
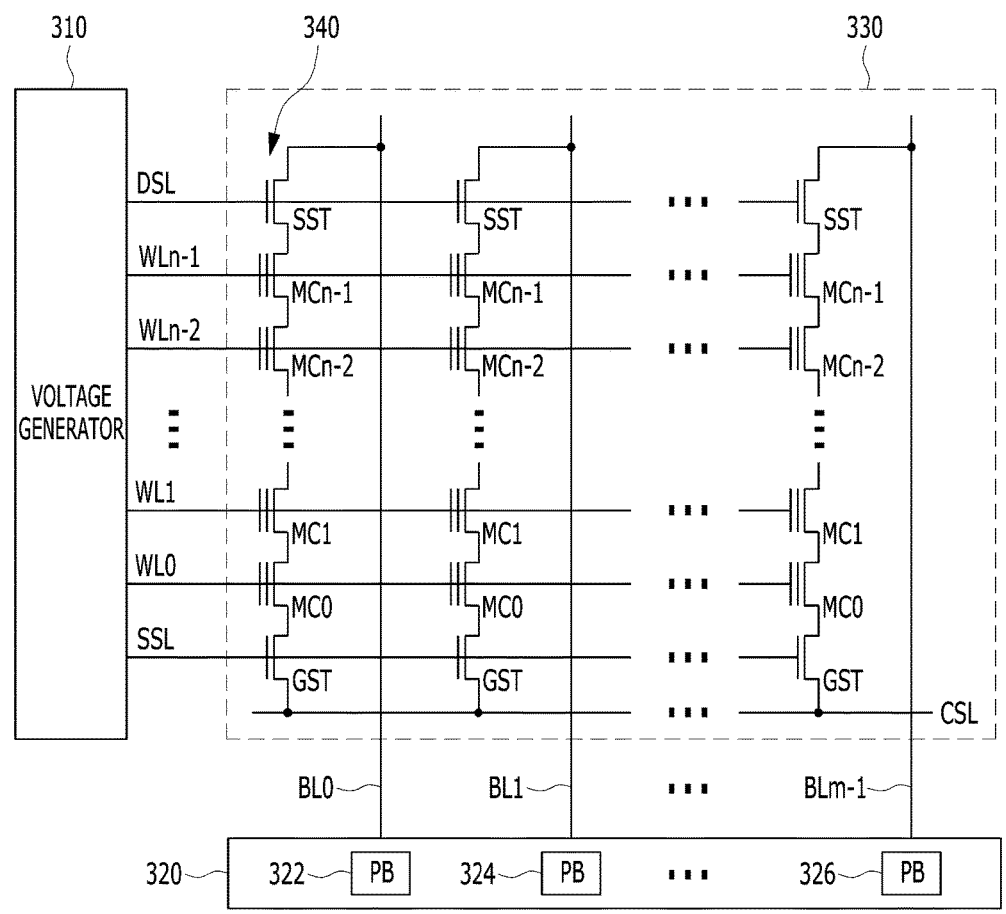
FIG. 3 is a circuit diagram illustrating a memory block in a memory device, according to an embodiment of the present invention.

Referring to FIG. 3, a memory block 152 of the memory device 150 may include a plurality of cell strings 340 coupled electrically to bit lines BL0 to BLm-1 respectively. Each cell string 340 may include at least one drain select transistor DST and at least one source select transistor SST. A plurality of memory cells or a plurality of memory cell transistors MC0 to MCn-1 may be coupled electrically in series between the select transistors DST and SST. The respective memory cells MC0 to MCn-1 may consist of multi-level cells (MLC) each of which stores data information of a plurality of bits. The memory cells may have any suitable architecture.

In FIG. 3, 'DSL' denotes a drain select line, 'SSL' denotes a source select line, and 'CSL' denotes a common source line.

FIG. 3 shows, as an example a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines) Each of the page buffers 322, 324 and 326 may include a plurality of latches (not shown).

Figure 4:
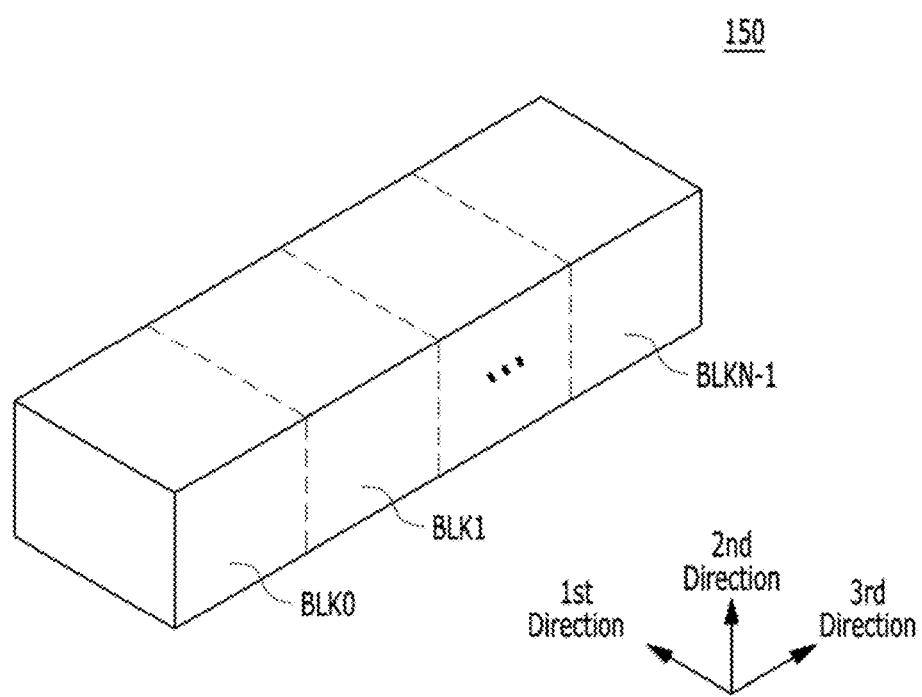
FIGS. 4 to 11 are diagrams schematically illustrating various aspects of the memory device shown in FIG. 2, according to embodiments of the present invention.

FIG. 4 is a block diagram illustrating an example of the plurality of memory blocks 152 to 156 of the memory device 150, according to an embodiment of the present inventions.

As shown in FIG. 4, the memory device 150 may include a plurality of memory blocks BLK0 to BLKN-1. Each of the memory blocks BLK0 to BLKN-1 may be realized in a 3D structure or a vertical structure. The respective memory blocks BLK0 to BLKN-1 may include a plurality of structures extending in first to third directions, for example, an x-axis direction, a y-axis direction and a z-axis direction.

The respective memory blocks BLK0 to BLKN-1 may include a plurality of NAND strings NS extending in the second direction (FIG. 8) The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN-1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
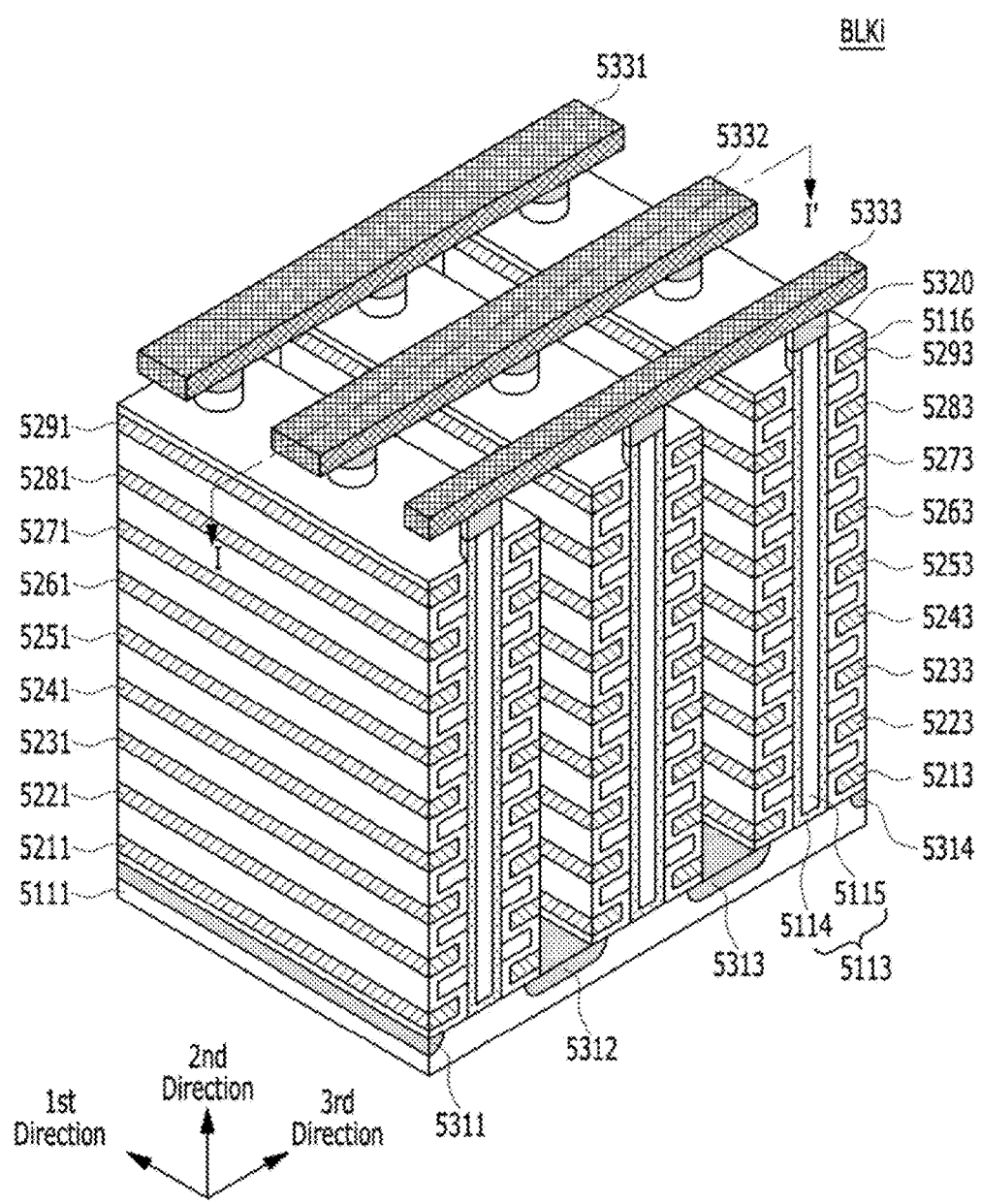
Figure 6:
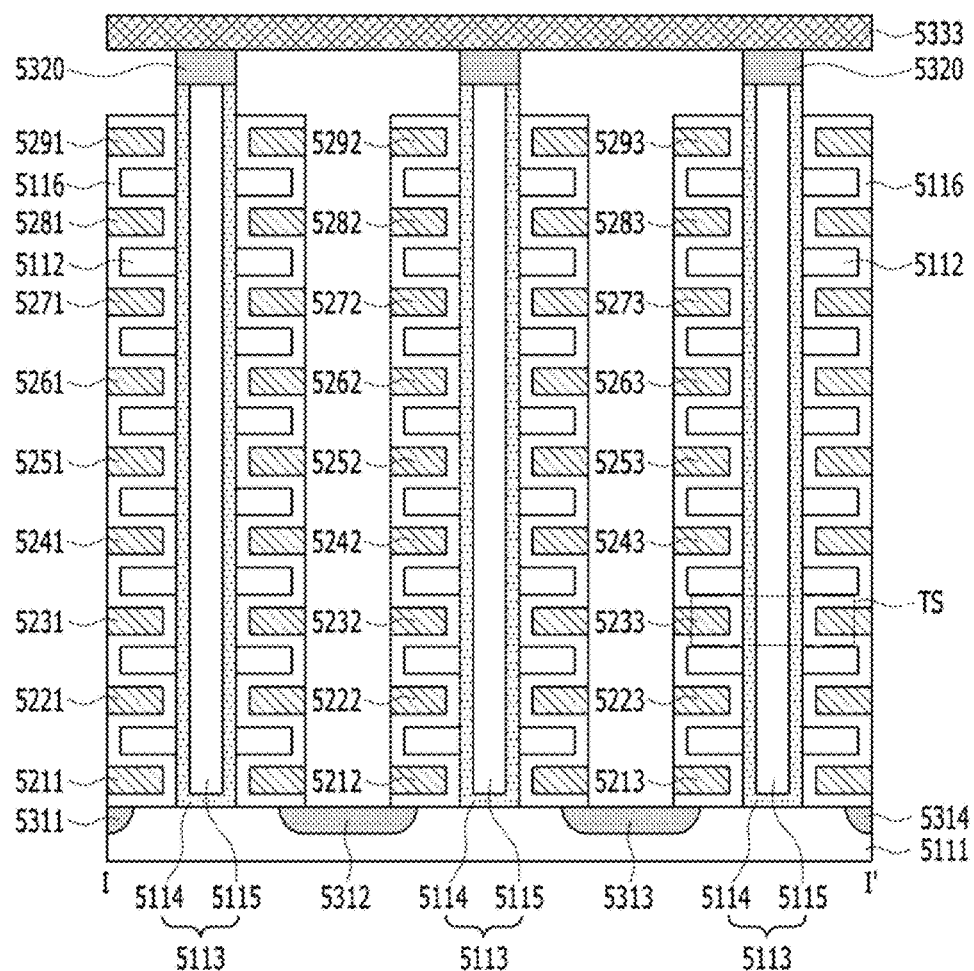

FIG. 5 is a perspective view of one memory block BLKi of the plurality memory blocks BLK0 to BLKN-1 shown in FIG. 4 FIG. 6 is a cross-sectional view taken along a line I-I' of the memory block BLKi shown in FIG. 5.

Referring to FIGS. 5 and 6 memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
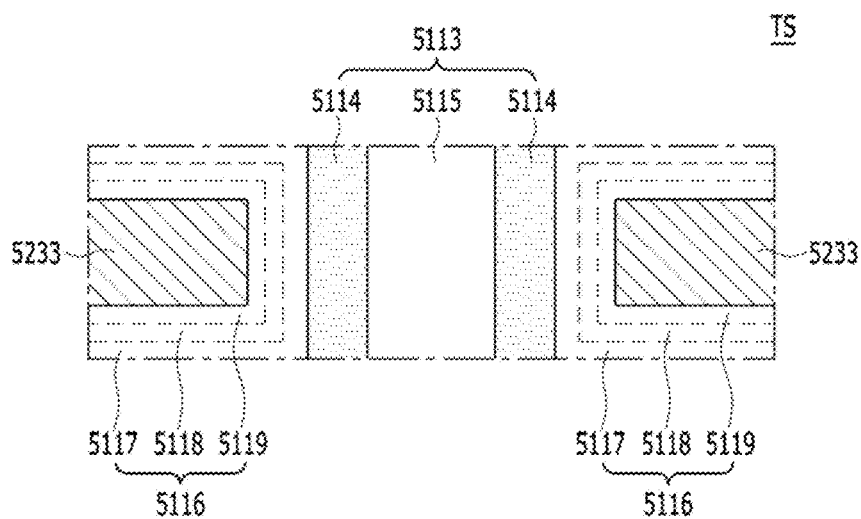

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119 the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory, block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS the number of transistors may be 8, 16 or more.

Although it is illustrated in FIGS. 5 to 7 that three (3) NAND strings NS are coupled electrically to one-bit line BL, it is noted that the embodiment is not limited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to tone-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Figure 8:
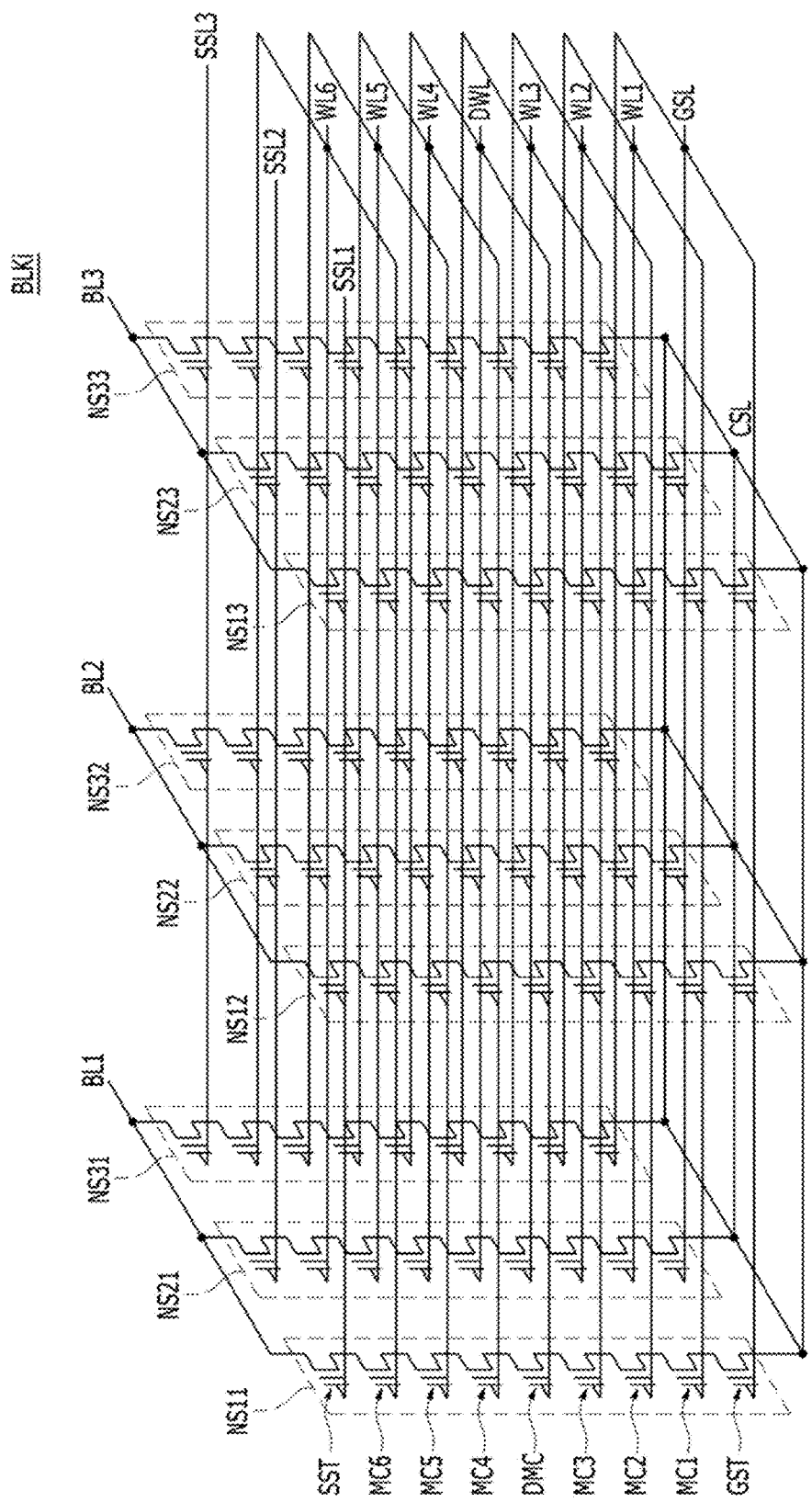

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected. Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
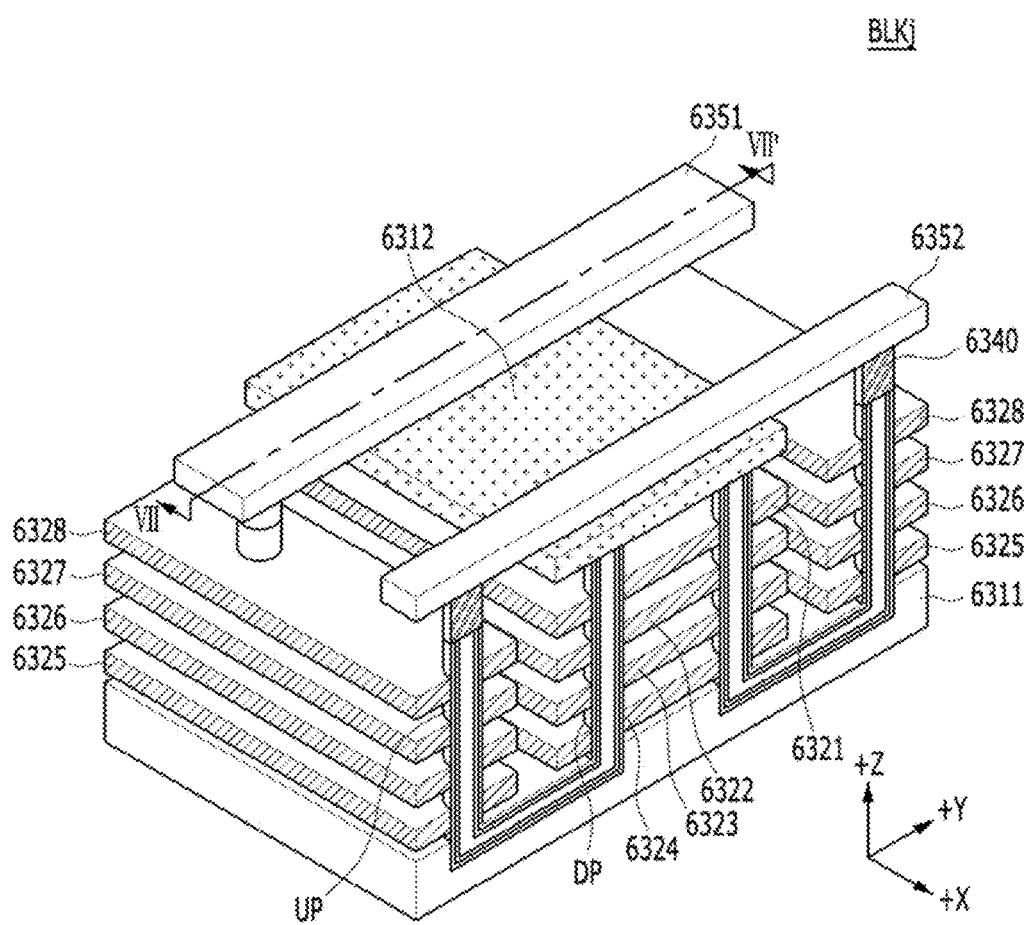

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
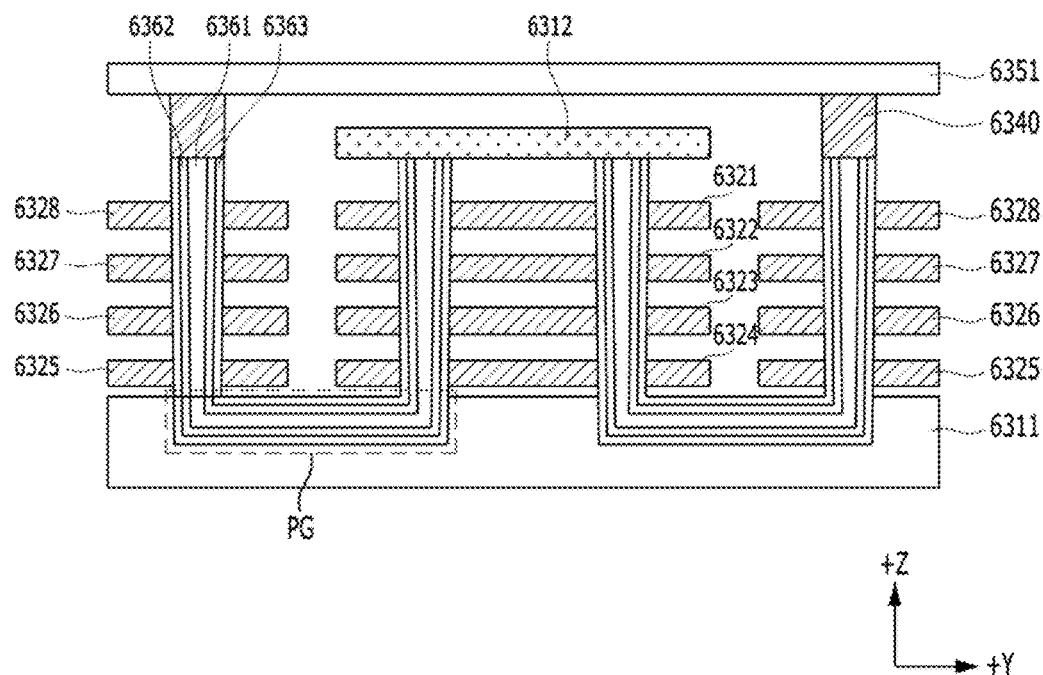

Referring to FIGS. 9 and 10 the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type si icon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars P. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4 the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
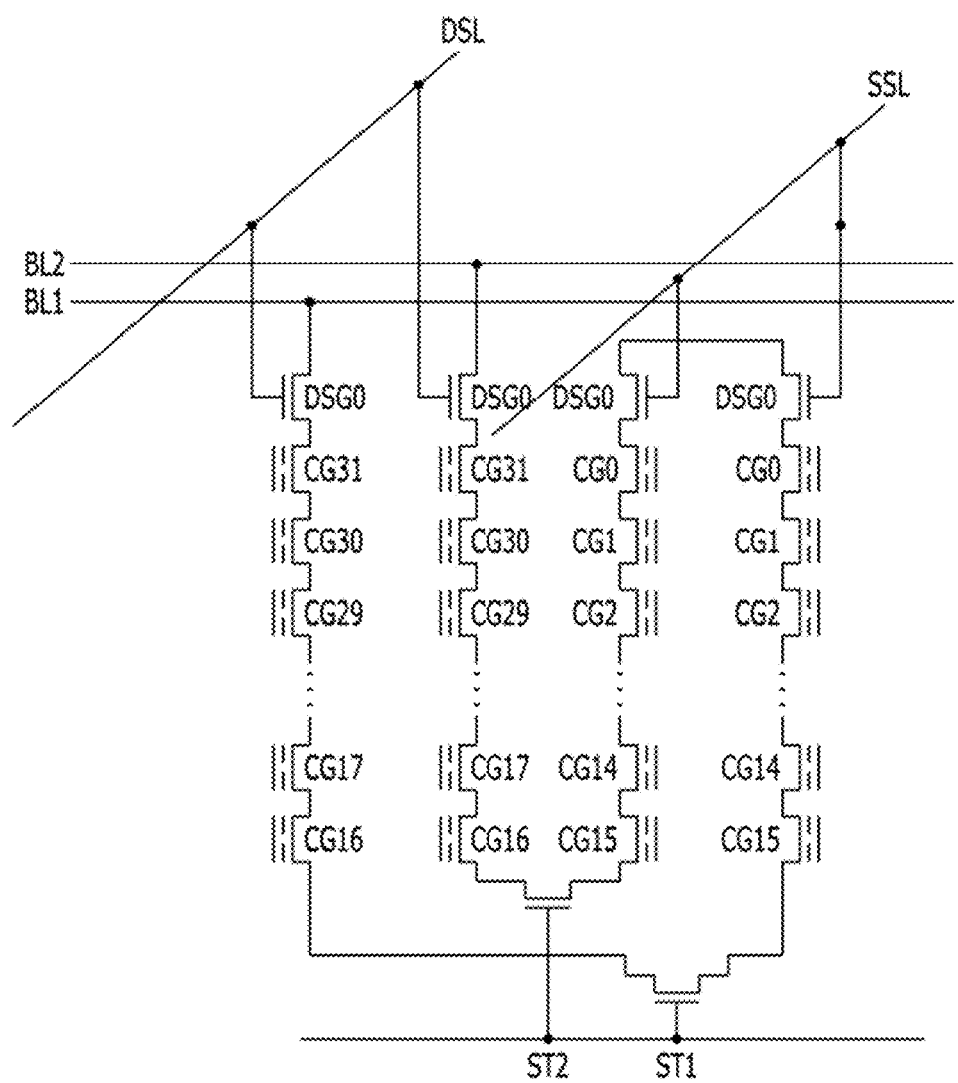

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2. Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Hereafter, a data processing operation to a memory device in a memory system in accordance with an embodiment of the present invention will be described in more detail with reference to FIGS. 12 to 15. In some embodiments, a command processing operation to the memory device 150 according to a command received from the host 102 will be described.

Figure 12:
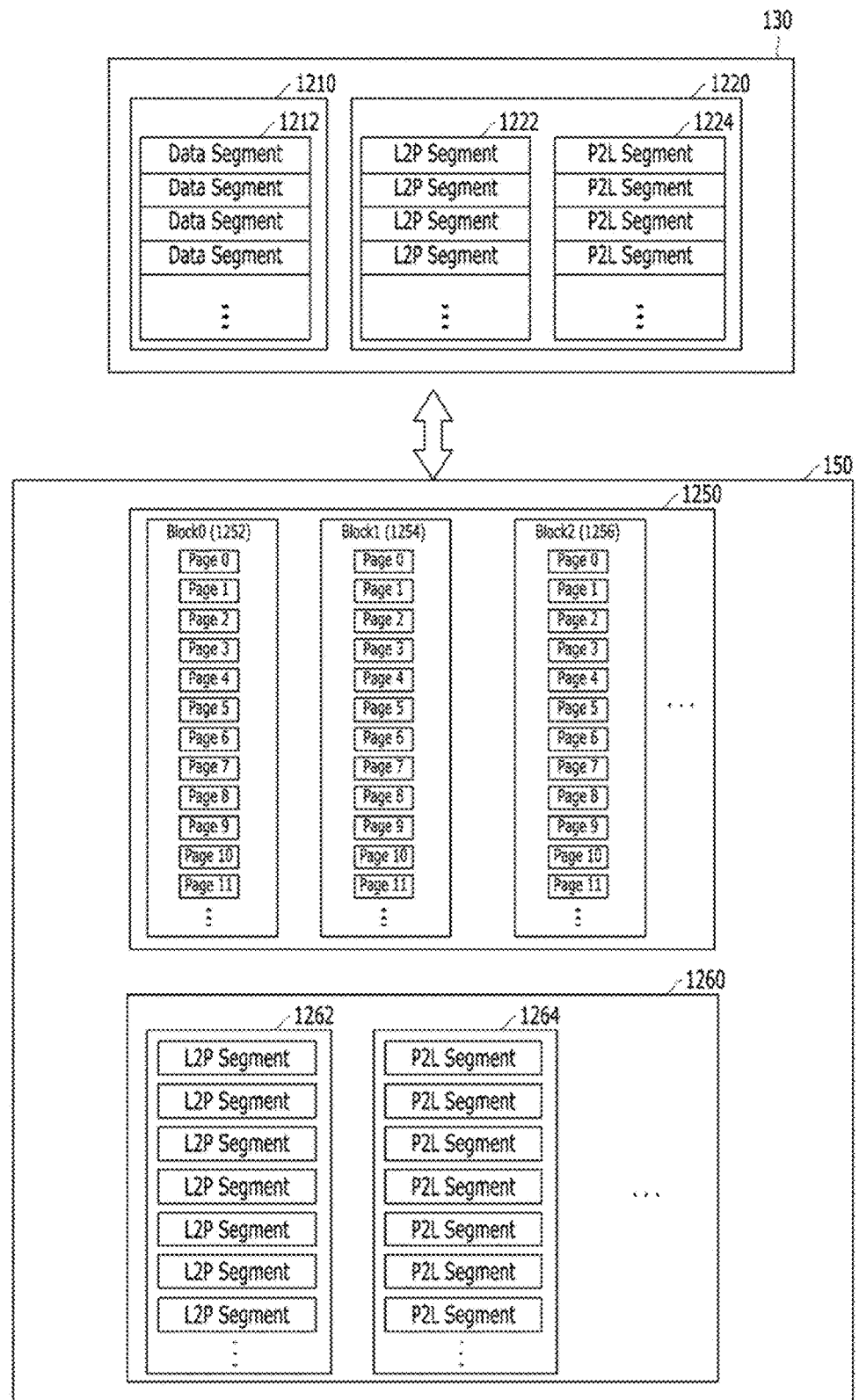
FIGS. 12 to 14 are diagrams illustrating a data processing operation of a memory system, according to an embodiment of the present invention.
Figure 13:
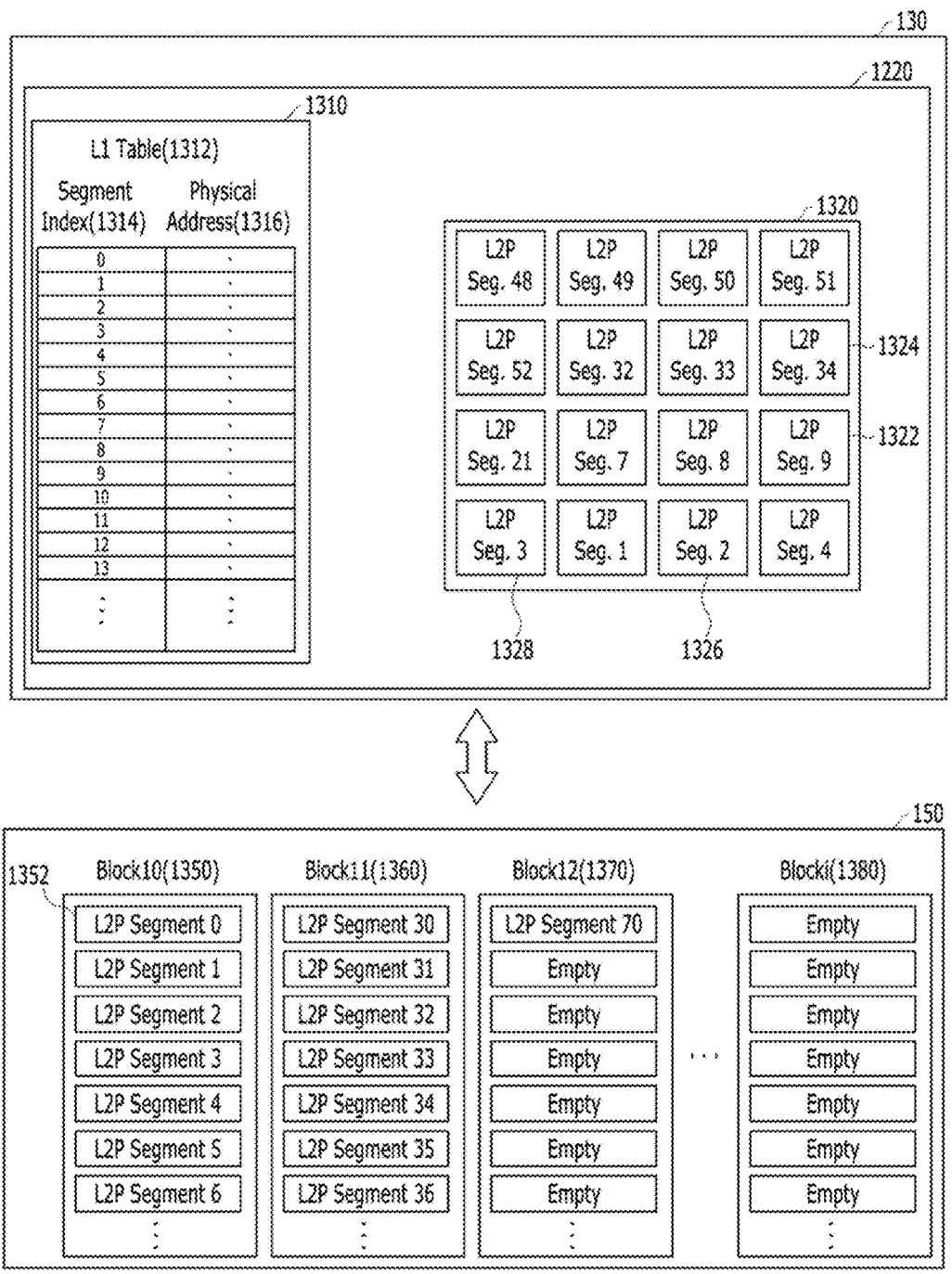
Figure 14:
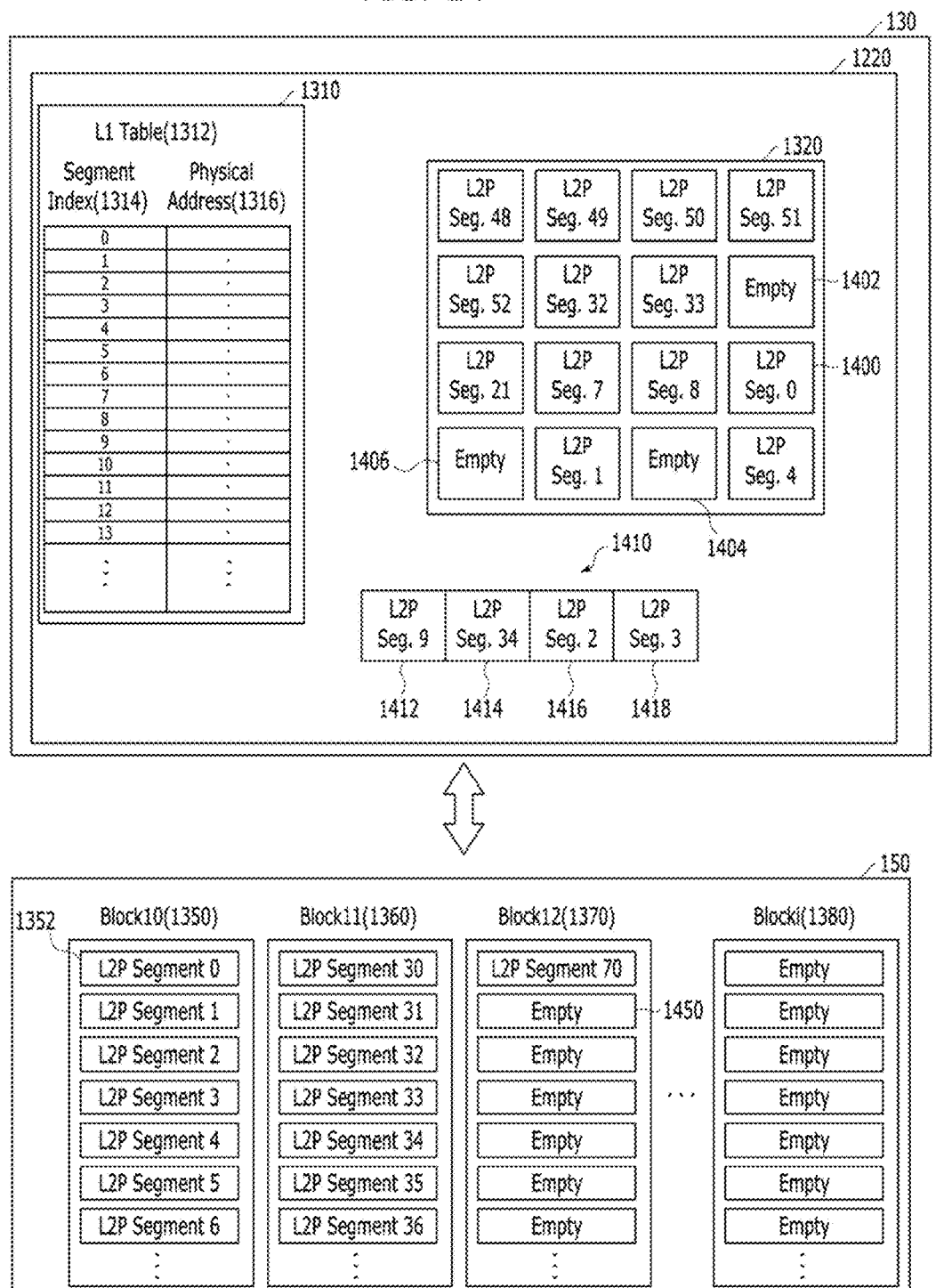

FIGS. 12 to 14 are diagrams illustrating a data processing operation of a memory system, according to an embodiment of the present invention. The memory system may be, for example, the memory system 110 illustrated in FIG. 1. Accordingly the memory system 110, for example, may write and store command data corresponding to a command received from the host 102. The memory system 110 may write and store write data corresponding to a received write command into a plurality of memory blocks included in the memory device 150. Also, the memory system 110 may update map data corresponding to the data written to the plurality of memory blocks, and store the updated map data in the plurality of memory blocks to perform the command operation on the memory device 150.

Furthermore, for convenience of description it is assumed that the data processing operation of the memory system may be performed by the controller 130, as an example. The processor 134 included in the controller 130 may perform the data processing operation through FTL, for example. Furthermore, the controller 130 may perform a write operation corresponding to a command received from the host 102. That is, the controller 130 may write and store user data corresponding to the command into memory blocks of the memory device 150. Furthermore, the controller 130 may generate and update map data corresponding to the storage of the user data. For example, the map data may include first map data containing Logical to Physical (L2P) information (hereafter, referred to as 'logical information') and second map data containing Physical to Logical (P2L) information (hereafter referred to as 'physical information'). Then, the controller 130 may write and store the generated and updated map data into the memory blocks of the memory device 150.

In the present embodiment, when a write command is received from the host 102, the controller 130 may write and store user data corresponding to the write command into memory blocks of the memory device 150. For example, the controller 130 may write and store the user data corresponding to the write command into open blocks or free blocks among a plurality of user data blocks of the memory blocks.

The controller 130 may update and store first map data and second map data in memory blocks. For example, the controller 130 may access open blocks or free blocks among the plurality of map blocks of the memory blocks. The first map data may include an L2P map table as logical information containing mapping information between logical addresses and physical addresses on the user data stored in the memory blocks. The second map data may include a P2L map table as physical information containing mapping information between physical addresses and logical addresses on the memory blocks having the user data stored therein.

In particular, when a write command is received from the host 102, the controller 130 may write and store user data corresponding to the write command into memory blocks, and store first and second map data for the user data stored in the memory blocks into memory blocks. At this time, the controller 130 may store data segments of the user data and physical segments (e.g., P2L segments) in the memory blocks of the memory device 150. The physical segments may include the physical information of the second map data corresponding to logical segments of the first map data (e.g., L2P segments).

In the present embodiment, the controller 130 may write and store the data segments of the user data corresponding to the write command received from the host 102 into a plurality of pages of the corresponding memory block among the memory blocks of the memory device 150 on a program basis (i.e., a page basis). Furthermore the controller 130 may write and store map segments of map data corresponding to the write operation for the user data into pages of the corresponding memory block also on a program basis (i.e. the page basis) For example, the controller 130 may write and store map segments of the first and second map data (i.e., L2P segments and P2L segments) into pages of the corresponding memory block on the program basis (i.e., the page basis). In particular, the controller 130 may write and store the map segments updated through the update of the map data into the pages of the memory block on the program basis (i.e., the page basis).

In particular, when map segments having a smaller size than the size of the unit program or the size of the unit page are generated and updated according to the update of the map data, the controller 130 may select a plurality of map segments, and set the size of the selected map segments to the size of the unit page. For example, when map segments having a smaller size than a unit page of 4 kilobyte (KB), (e.g., a size corresponding to an NOP (Number of Partial program) of 1 KB) are generated and updated the controller 130 may select a plurality of map segments, and set the size of the selected map segments to the size of the unit page. The NOP may be obtained by dividing the unit program. In other words, when map segments are generated and updated as the size corresponding to a NOP of 1 KB instead of the size corresponding to a unit page of 4 KB, the controller 130 may select a plurality of map segments having the NOP size, set the entire size of the plurality of map segments to the size of the unit page of 4 KB, and write and store the selected map segments into pages included in the corresponding memory block on the page basis. For example, when each of the map segments has a NOP size of 1 KB as described above, the controller 130 may select four map segments, set the entire size of the map segments to 4 KB corresponding to the size of the unit page, and write and store the selected map segments into pages of the corresponding memory block on the page basis.

Hereafter, for convenience of description, an example of a data processing operation is described in the following case wherein: when data segments of user data and map segments of map data are written and stored into memory blocks of the memory device 150 on the program basis (i.e., the page basis), the size of the unit page is set to 4 KB, the size of each data segment is set to 4 KB, and the size of each map segment is set to 1 KB. However it is noted that the memory system may write and store data segments having a first size and map segment having a second size into pages included in memory blocks of the memory device 150, on the program basis corresponding to a third size, (i.e., on the page basis).

That is, the controller 130 may write and store data segments of user data corresponding to a write command received from the host 102 and map segments of map data into pages included in memory blocks of the memory device 150 on the program basis (i.e., the page basis). Furthermore, when the size of a data segment or map segment written at an arbitrary time point is smaller than the size of the unit page, the controller 130 may select a data segment or map segment to be written at a time point next to the arbitrary time point, and write the selected data segment or map segment on the page basis. In other words, the controller 130 may select a data segment or map segment having the NOP size at an arbitrary time point and a data segment or map segment at the next time point, and then write and store the selected data segments or map segments into pages of the corresponding memory block on the page basis. At this time, the data segment or map segment having the NOP size at the next time point may be pre-written and stored into memory blocks of the memory device 150.

Therefore, the memory system may write and store write data corresponding to a write command received from the host 102 on the page basis. The memory system may also write and store map data for the write data on the page basis. Thus, the memory system may rapidly process both the write data and the map data, which means that the memory system may perform the write operation more rapidly than existing memory systems.

Hereafter, the data processing operation of the memory system will be described in more detail with reference to FIGS. 12 to 14.

Referring to FIG. 12, the controller 130 may write and store data corresponding to a command received from the host 102 into open blocks of a data block 1250 among the memory blocks of the memory device 150. For example, the controller 130 may write and store user data corresponding to a write command into open blocks of a data block 1250 among the memory blocks of the memory device 150, i.e., a block 0 (1252), a block 1 (1254), and a block 2 (1256). Furthermore, the controller 130 may store map data for the user data in open blocks 1262 and 1264 of a map block 1260 among the memory blocks of the memory device 150, according to the write operation to the data block 1250.

The controller 130 may store information indicating that the user data are stored in the pages of the block 0 (1252), the block 1 (1254), and the block 2 (1256) in the memory device 150, e.g., first and second map data, into open blocks included in the map block 1260. In other words, the controller 130 may store logical segments of the first map data (i.e., L2P segments) in the first block 1262 of the map block 1260, and store physical segments of the second map data (i.e., P2L segments) in the second block 1264 of the map block 1260.

The controller 130 may cache and buffer data corresponding to a command received from the host 102 (e.g., user data corresponding to a write command) into a first buffer 1210 included in the memory 144 of the controller 130. In other words, the controller 130 may store data segments 1212 of the user data in the first buffer 1210 serving as a data buffer/cache. Then, the controller 130 may write and store the data segments 1212 stored in the first buffer 1210 into pages of the open, blocks 1252, 1254, and 1256 included in the data block 1250 of the memory device 150 on the program basis or the page basis.

As the data segments 1212 of the user data corresponding to the command received from the host 102 are written and stored into the pages of the open blocks 1252, 1254, and 1256 included in the data block 1250 of the memory device 150, the controller 130 may generate first and second map data, and store the first and second map data in a second buffer 1220 included in the memory 144 of the controller 130. That is, the controller 130 may store L2P segments 1222 of the first map data for the user data and P2L segments 1224 of the second map data into the second buffer 1220 serving as a map buffer/cache. At this time, the second buffer 1220 of the memory 144 of the controller 130 may store the L2P segments 1222 of the first map data and the P2L segments 1224 of the second map data. For example, the second buffer 1220 may store a map list of the L2P segments 1222 of the first map data, and a map list of the P2L segments 1224 of the second map data.

The controller 130 may store the L2P segments 1222 of the first map data and the P2L segments 1224 of the second map data which are stored in the second buffer 1220, into the first and second blocks 1262 and 1264 of the map block 1260 of the memory device 150, respectively, on the program basis, for example, the page basis. Furthermore, for performing a command operation corresponding to a command received from the host 102, (e.g., a write operation or read operation), the controller 130 may scan first and second map data for user data corresponding to the command. In an embodiment, the controller 130 may scan map data for the user data in the L2P segments 1222 of the first map data and the P2L segments 1224 of the second map data, which are stored in the second buffer 1220. In another embodiment, the controller 130 may load the L2P segments of the first map data and the P2L segments of the second map data, which are stored in the first and second blocks 1262 and 1264 of the map block 1260 of the memory device 150, respectively, to the second buffer 1220 and then scan map data for the user data in the L2P segments 1222 of the first map data and the P2L segments 1224 of the second map data, which are loaded in the second buffer 1220. Hereafter, for convenience of description, the case in which the data segments 1212 of the user data corresponding to the write command received from the host 102 are written and stored into the block 0 (1252) among the memory blocks of the memory device 150 and the case in which the map segments of the map data corresponding to the storage of the data segments 1212, (e.g., the L2P segments 1222 of the first map data) are updated and stored in the first block 1262 among the memory blocks of the memory device 150 will be taken as an example for description.

Referring to FIGS. 12 and 13, when a command (e.g., a write command) is received from the host 102, the controller 130 may store data segments 1212 of user data corresponding to the write command in the first buffer 1210 included in the memory 144 of the controller 130. At this time, the controller 130 may store the data segments 1212 of the user data in the first buffer 1210. For example, the data segments 1212 may include a data segment with a logical page number 0 (hereafter, referred to as data 0), a data segment with a logical page number 5 (hereafter, referred to as data 5), a data segment with a logical page number 31 (hereafter, referred to as data 31), and a data segment with a logical page number 36 (hereafter, referred to as data 36).

The controller 130 may write and store the data segments 1212 of the user data, stored in the first buffer 1210, into pages included in the block 0 (1252) of the memory device 150. Among the data segments 1212 of the user data stored in the first buffer 1210, the data 0 may be stored in the page 0 of the block 0 (1252), the data 5 may be stored in the page 1 of the block 0 (1252), the data 31 may be stored in the page 2 of the block 0 (1252), and the data 36 may be stored in the page 3 of the block 0 (1252).

The data segments 1212 stored in the first buffer 1210 of the controller 130 may have a size corresponding to the unit program, for example, the unit page (e.g., 4 KB). The controller 130 may store the data segments 1212 stored in the first buffer 1210 into memory blocks of the memory device 150 on the program basis, for example, the page basis. For example, the data 0, 5, 31, and 36 may have a size of 4 KB, respectively, and the controller 130 may store all these data (i.e., data 0, 5, 31, and 36) which are stored in the first buffer 1210, into the corresponding pages Page0, Page1, Page2, and Page3 of the block 0 (1252) in the data block 1250 of the memory device 150 on the page basis of 4 KB.

The controller 130 may generate information indicating that the data segments 1212 of the user data are written and stored into pages included in the block 0 (1252) of the memory device 150 e.g., the L2P segments 1222 of the first map data. Then, the controller 130 may store the L2P segments 1222 of the first map data in the second buffer 1220, and store the L2P segments 1222 stored in the second buffer 1220 into the first block 1262 included in the map block 1260 of the memory device 150. For example, the controller 130 may store the L2P segments 1222 stored in the second buffer 1220 into a block 10 (1350), a block 11 (1360), a block 12 (1370), and a block i (1380).

As the data 0, 5, 31, and 36 are stored in the corresponding pages Page0, Page1, Page2, and Page3 of the block 0 (1252) in the data block 1250 of the memory device 150 on the page basis, the controller 130 may update the map data according to the storage of the data 0, 5, 31, and 36.

More specifically, as the data 0, 5, 31, and 36 are stored in the corresponding pages Page0, Page1, Page2, and Page3 of the block 0 (1252), the controller 130 may generate an L2P segment indicating that the data 0 is stored in the page 0 of the block 0 (1252) (hereafter, referred to as L2P segment 0), an L2P segment indicating that the data 5 is stored in the page 1 of the block 0 (1252) (hereafter, referred to as L2P segment 5), an L2P segment indicating that the data 31 is stored in the page 2 of the block 0 (1252) (hereafter, referred to as L2P segment 31), and an L2P segment indicating that the data 36 is stored in the page 3 of the block 0 (1252) (hereafter, referred to as L2P segment 36) The controller 130 may include these L2P segments in a map table for the first map data i.e., an L1 table 1312 including segment indexes 1314 and physical addresses 1316 for the indexes 1314 indicating the logical addresses (or logical page numbers) of the data segments.

That is, the controller 130 may generate the L2P segment 0 corresponding to the storage of the data 0 in the page 0 of the block 0 (1252), the L2P segment 5 corresponding to the storage of the data 5 in the page 1 of the block 0 (1252), the L2P segment 31 corresponding to the storage of the data 31 in the page 2 of the block 0 (1252), and the L2P segment 36 corresponding to the storage of the data 36 in the page 3 of the block 0 (1252). Then the controller 130 may write the L2P segments to the map table 1310 or 1312 for the first map data stored in the second buffer 1220. Furthermore, the controller 130 may update the map data (i.e., the map data according to the storage of the data 0, the data 5, the data 31, and the data 36), and update the L2P segment 0, the L2P segment 5, the L2P segment 31, and the L2P segment 36 according to the update of the map data.

In order to update the map data, the controller 130 may check whether the L2P segments corresponding to the update, (i.e., the L2P segment 0, the L2P segment 5, the L2P segment 31, and the L2P segment 36) exist among the L2P segments 1320 stored in the second buffer 1220. In other words, the controller 130 may check whether the L2P segment 0, the L2P segment 5, the L2P segment 31, and the L2P segment 36 to be updated are included in the L2P segments 1320 stored in the second buffer 1220. At this time, when L2P segments to be updated do not exist among the L2P segments 1320 stored in the second buffer 1220, the controller 130 may load L2P segments to be updated to the second buffer 1220 from the memory blocks of the memory device 150, and then update the loaded L2P segments (i.e., map data).

As shown in FIG. 13, since the L2P segment 0, the L2P segment 5, the L2P segment 31, and the L2P segment 36 which are to be updated are not included in the L2P segments 1320 stored in the second buffer 1220, the controller 130 may load the L2P segment 0, the L2P segment 5, the L2P segment 31, and the L2P segment 36, which are stored in memory blocks of the memory device 150 (e.g., the block 10 (1350) and the block 11 (1360)), to the second buffer 1220.

For example, in order to update the L2P segment 0 according to the storage of the data 0 in the page 0 of the block 0 (1252), the controller 130 may load the L2P segment 0 (1352) stored in the block 10 (1350) to the second buffer 1220 of the controller 130. In other words, the controller 130 may load the L2P segment 0 (1352) stored in the block 10 (1350) to the L2P segments 1320 stored in the second buffer 1220. At this time, since the memory size of the second buffer 1220 of the controller 130 may be limited, an empty area for loading the L2P segment 0 (1352) does not exist in the L2P segments 1320 stored in the second buffer 1220.

Thus, the controller 130 may retain the L2P segments 1320 stored the second buffer 1220 or transmit the L2P segments 1320 to the memory device 150, according to cache replacement policy considering the priority of the cache segments. For example, the cache replacement policy may be replacements of Most Recently Used (MRU) segments or LRU (Least Recently Used (LRU) segments. That is, the controller 130 may retain the L2P segments 1320 stored in the second buffer 1220 or store the L2P segments 1320 in memory blocks of the memory device 150, according to the cache replacement policy.

Hereafter, for convenience of description, it is supposed that the cache replacement priority is determined in order of the L2P segment 9 (1322), the L2P segment 34 (1324), the L2P segment 2 (1326), and the L2P segment 3 (1328) among the L2P segments 1320 of the second buffer 1220, according to the cache replacement considering the MRU/LRU. Thus, the L2P segment 9 (1322), the L2P segment 34 (1324), the L2P segment 2 (1326), and the L2P segment 3 (1328) are sequentially selected as victim segments to be replaced or transmitted and stored into memory blocks of the memory device 150. Furthermore, it is supposed that the map segments of the map data or the L2P segments of the map data have a second size (i.e., a NOP size of 1 KB).

Referring to FIG. 14, since an empty area for loading the L2P segment 0 (1352) does not exist among the L2P segments 1320 stored in the second buffer 1220 of the controller 130, the controller 130 may select the L2P segment 9 (1322) having the highest cache replacement priority as a first transmission (Tx) L2P segment 1412, in order to generate an empty area for the L2P segment 0 (1352). That is, the controller 130 may select the L2P segment 9 (1322) among the L2P segments 1320 stored in the second buffer 1220 as the first Tx L2P segment 1412, and determine the area in which the L2P segment 9 (1322) among the L2P segments 1320 is positioned, as a first empty area 1400. Furthermore, the controller 130 may load the L2P segment 0 (1352) stored in the block 10 (1350) to the first empty area 1400 of the L2P segments 1320 stored in the second buffer 1220. That is, the controller 130 may load the L2P segment 0 (1352) to the L2P segments 1320 stored in the second buffer 1220.

As described above the controller 130 may write and store the map segments stored in the second buffer 1220 as well as the data segments stored in the first buffer 1210 into memory blocks of the memory device 150 on the program basis or the page basis. Thus, the first Tx L2P segment 1412 may be written and stored into the memory block of the memory device 150 on the page basis. At this time, since the size of the first Tx L2P segment 1412 (i.e., the size of the L2P segment 9 (1322) selected as the first Tx L2P segment 1412) is 1 KB, the size of the first Tx L2P segment 1412 is smaller than the size of the unit page when the map segments are stored in memory blocks of the memory device 150. In other words, the size of the first Tx L2P segment 1412 (e.g., the NOP size of 1 KB) is smaller than the size of the unit page of 4 KB. Thus, the controller 130 may select other map segments which are to be stored in the memory blocks of the memory device 150 with the first Tx L2P segment 1412, on the page basis.

More specifically, since the size of the first Tx L2P segment 1412 stored in the memory block of the memory device 150 is smaller than the size of the unit page at the current time point, the controller 130 may select L2P segments which to be pre-written with the first Tx L2P segment

1412, among the L2P segments 1320 stored in the second buffer 1220. At this time, the controller 130 may select the L2P segments having the cache replacement priority next to the highest cache replacement priority among the L2P segments 1320 stored in the second buffer 1220, according to the cache replacement policy. For example, the controller 130 may select the L2P segment 34 (1324), the L2P segment 2 (1326), and the L2P segment 3 (1328) as a second Tx L2P segment 1414, a third Tx L2P segment 1416 and a fourth Tx L2P segment 1418.

In other words, since the size of the first Tx 2P segment 1412 is 1 KB corresponding to a part of the unit page of 4 KB, the controller 130 may select three map segments each having a size of 1 KB, which correspond to the other part of the page unit or 3 KB, among the L2P segments 1320 stored in the second buffer 1220, according to the cache replacement priority. For example, the controller 130 may select the L2P segment 34 (1324), the L2P segment 2 (1326), and the L2P segment 3 (1328) among the L2P segments 1320 stored in the second buffer 1220, according to the cache replacement priority. That is, the controller 130 may select the L2P segment 34 (1324) as the second Tx L2P segment 1414, select the L2P segment 2 (1326) as the third Tx L2P segment 1416, and select the L2P segment 3 (1328) as the fourth Tx L2P segment 1418. Thus, the controller 130 may set the areas in which the L2P segment 34 (1324), the L2P segment 2 (1326), and the L2P segment 3 (1328) among the L2P segments 1320 stored in the second buffer 1220 are positioned, to a second empty area 1402, a third empty area 1404, and a fourth empty area 1406, respectively.

The controller 130 may load the L2P segment 5, which is stored in the block 10 (1350) of the memory device 150 corresponding to the data 5, into the second empty area 1402 of the second buffer 1220. Also, the controller 130 may load the L2P segment 31 and the L2P segment 36, which are stored in the block 11 (1360) of the memory device 150 corresponding to the data 31 and the data 36, respectively, into the third empty area 1404 and the fourth empty area 1406 of the second buffer 1220. Then, the controller 130 may update the L2P segment 5, the L2P segment 31, and the L2P segment 36 according to the storage of the data 5, the data 31, and the data 36.

The controller 130 may transmit the entire Tx L2P segment 1410 with a size of 4 KB including the Tx L2P segments 1412, 1414, 1416, and 1418 to the memory device 150, and write and store the entire Tx L2P segment 1410 into a memory block of the memory device 150 on the page basis. For example, the entire Tx L2P segment 1410 may be stored in an empty page 1450 of the block 12(1370).

When the memory system according to an embodiment of the present invention performs a command operation corresponding to a command received from the host 102, the memory system may write and store segments of data stored in the memory 144 of the controller 130 into memory blocks of the memory device 150 on a page basis, according to the command operation. At this time, when the size of segments to be stored at an arbitrary first time point is smaller than the size of the unit page, the memory system may select segments to be stored at a second time point following the first time point as well as the segments to be stored at the first time point according to the size of the unit page. Then, the memory system may write the selected segments to the memory blocks of the memory device 150 on the page basis at the first time point, thereby pre-writing the segments stored at the second time point. Thus, the segments of the data stored in the memory 144 of the controller 130 may be rapidly processed to the memory blocks of the memory device 150. Then, referring to FIG. 15, the data processing operation of the memory system according to an embodiment of the present invention will be described in more detail.

Figure 15:
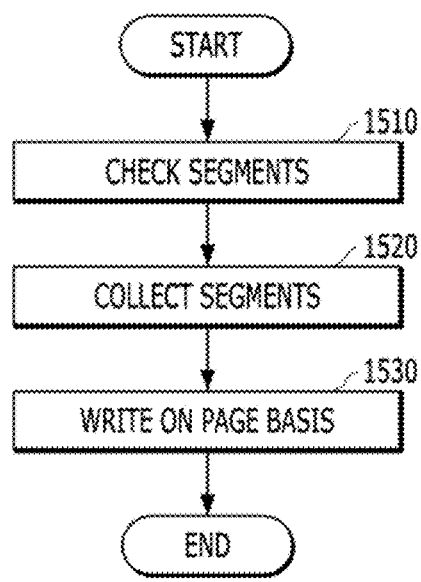
FIG. 15 is a flowchart schematically illustrating a data processing operation of a memory system, according to an embodiment of the present invention.

FIG. 15 is a flowchart schematically illustrating the operation of processing data in the memory system according to an embodiment of the present invention. For example, the operation may be performed by the memory system shown in FIGS. 1, 12, 13 and 14.

Referring to FIG. 15, when the memory system 110 receives a command from a host 102 and performs a command operation corresponding to the command, the memory system 110 may check segments of data to be stored into memory blocks of the memory device 150 from the memory 144 of the controller 130, at step 1510. That is, when the memory system 110 writes and stores data corresponding to the command operation into a memory block of the memory device 150 on a program basis or page basis, the memory system 110 may check the segments of the data stored in the memory 144 of the controller 130.

When it is checked that the size of segments to be stored into the memory block of the memory device 150 at an arbitrary time point is smaller than the size of the unit page, the memory system 110 may select and collect segments to be stored into the memory block at the next time point of an arbitrary time point, at step 1520.

Then the memory system 110 may write and store the selected segments into memory blocks of the memory device 150 on a page basis, at step 1530.

At this time, since the operation of checking the segments of the data stored in the memory 144 of the controller 130 and the size of the segments, selecting segments corresponding to the size of the segments, and writing and storing the selected segments into the memory blocks of the memory device 150 on a page basis has been described in more detail with reference to FIGS. 12 to 14, the detailed descriptions thereof are omitted herein.

As described above, the memory system and the operating method thereof in accordance with the embodiments of the present invention provide a less complex and more efficient method for accessing the memory device, thereby more rapidly and stably processing data to and from the memory device than existing memory systems.

Although various embodiments have been described for illustrative purposes, it will be apparent to those skilled in the art that various changes and modifications may be made without departing from the spirit and or the scope of the invention as defined in the following claims.

What is claimed is:
1. A memory system comprising:
a memory device including a plurality of memory blocks; and
a controller including a memory, the controller being suitable for storing segments of data corresponding to a command received from a host in the memory, and storing a first segment for a first time point and a second segment for a second time point after the first time point, selected from among the segments in at least one memory block of the memory blocks, on a program unit basis at the first time point, when the size of the first segment is smaller than the size of the program unit,
wherein the second segment is pre-written at the first time point before the second time point in the at least one memory block.

2. The memory system of claim 1, wherein the size of the second segment corresponds to a size obtained by excluding the size of the first segment from the size of the program unit.

3. The memory system of claim 1, wherein the controller stores the first segment for the first time point and the second segment for the second time point in a first memory block of the memory blocks on the program unit basis at the first time point, and the controller checks first map segments for the data in a second memory block of the memory blocks, and checks second map segments for the first map segments among the segments.

4. The memory system of claim 3, wherein the controller selects the second map segments as the first and second segments, and stores the first and second segments in the first memory block of the memory blocks on the program unit basis at the first time point.

5. The memory system of claim 3, wherein the controller determines empty areas at the positions of the second map segments in the segments, and loads the first map segments to the empty areas from the second memory block.

6. The memory system of claim 5, wherein the controller loads a third map segment among the first map segments to the empty areas at the first time point, and loads a fourth map segment among the first map segments to the empty areas at the second time point.

7. The memory system of claim 1, wherein each of the first and second segments has a size obtained by dividing the program unit.

8. The memory system of claim 1, wherein the first segment has a higher priority than the second segment according to cache replacement policy considering the priority of the segments, and is selected prior to the second segment.

9. The memory system of claim 1, wherein the segments comprise segments of user data corresponding to the command and segments of map data for the user data.

10. An operating method of a memory system including a memory device which includes a plurality of memory blocks and a controller having a memory, comprising:
receiving a command from a host;
storing segments of data corresponding to the command in the memory of the controller; and
storing a first segment for a first time point and a second segment for a second time point after the first time point, selected from among the segments in at least one memory block of the memory blocks, on a program unit basis at the first time point, when the size of the first segment is smaller than the size of the program unit,
wherein the second segment is pre-written at the first time point before the second time point in the at least one memory block.

11. The operating method of claim 10, wherein the size of the second segment corresponds to a size obtained by excluding the size of the first segment from the size of the program unit.

12. The operating method of claim 10, wherein storing of the first segment for the first time point and the second segment for the second time point comprises storing the first segment for the first time point and the second segment for the second time point in a first memory block of the memory blocks on the program unit at the first time point, and
further comprising:
checking first map segments for the data in a second memory block of the memory blocks; and
checking second map segments for the first map segments among the segments.

13. The operating method of claim 12, further comprising selecting the second map segments as the first and second segments, and storing the first and second segments in the first memory block of the memory blocks on the program unit basis at the first time point.

14. The operating method of claim 12, further comprising:
determining empty areas at the positions of the second map segments in the segments; and
loading the first map segments to the empty areas from the second memory block.

15. The operating method of claim 14, wherein the loading of the first map segments comprises:
loading a third map segment among the first map segments to the empty areas at the first time point; and
loading a fourth map segment among the first map segments to the empty areas at the second time point.

16. The operating method of claim 10, wherein each of the first and second segments has a size which is obtained by dividing the program unit.

17. The operating method of claim 10, wherein the first segment has a higher priority than the second segment according to cache replacement policy considering the priority of the segments, and is selected prior to the second segment.

18. The memory operating method of claim 10, wherein the segments comprise segments of user data corresponding to the command and segments of map data for the user data.

* * * * *